United States Patent [19]
Volkman

[11] 4,068,555
[45] Jan. 17, 1978

[54] INHERENTLY TORQUE-LIMITED NUT

[75] Inventor: Josef F. Volkman, Torrance, Calif.

[73] Assignee: Hi-Shear Corporation, Torrance, Calif.

[21] Appl. No.: 719,738

[22] Filed: Sept. 2, 1976

[51] Int. Cl.$^2$ ............................................. F16B 31/02
[52] U.S. Cl. .................................................... 85/61
[58] Field of Search .......... 85/61, 62, 53, 54, DIG. 2

[56] References Cited

U.S. PATENT DOCUMENTS

| | | | |
|---|---|---|---|
| 2,685,812 | 8/1954 | Dimitroff | 85/61 |
| 3,027,796 | 4/1962 | Shewmon | 85/61 |
| 3,349,662 | 10/1967 | Williams | 85/62 |
| 3,667,339 | 6/1972 | Dame | 85/61 |
| 3,709,087 | 1/1973 | Stone | 85/61 |
| 3,742,808 | 7/1973 | Trembley | 85/61 |
| 3,929,054 | 12/1975 | Gutshall | 85/61 |

FOREIGN PATENT DOCUMENTS

| | | | |
|---|---|---|---|
| 736,209 | 6/1966 | Canada | 85/61 |
| 684,821 | 12/1952 | United Kingdom | 85/61 |

*Primary Examiner*—Marion Parsons, Jr.
*Attorney, Agent, or Firm*—Donald D. Mon

[57] ABSTRACT

An inherently torque-limited nut including a nut body having an internal shank-receiving threaded opening to engage a mating thread on a shank. A drive ring is held to the nut body by engagement means and includes inherent limiting means which limit the torque which can be applied to the drive ring by failing at a predetermined torque.

8 Claims, 4 Drawing Figures

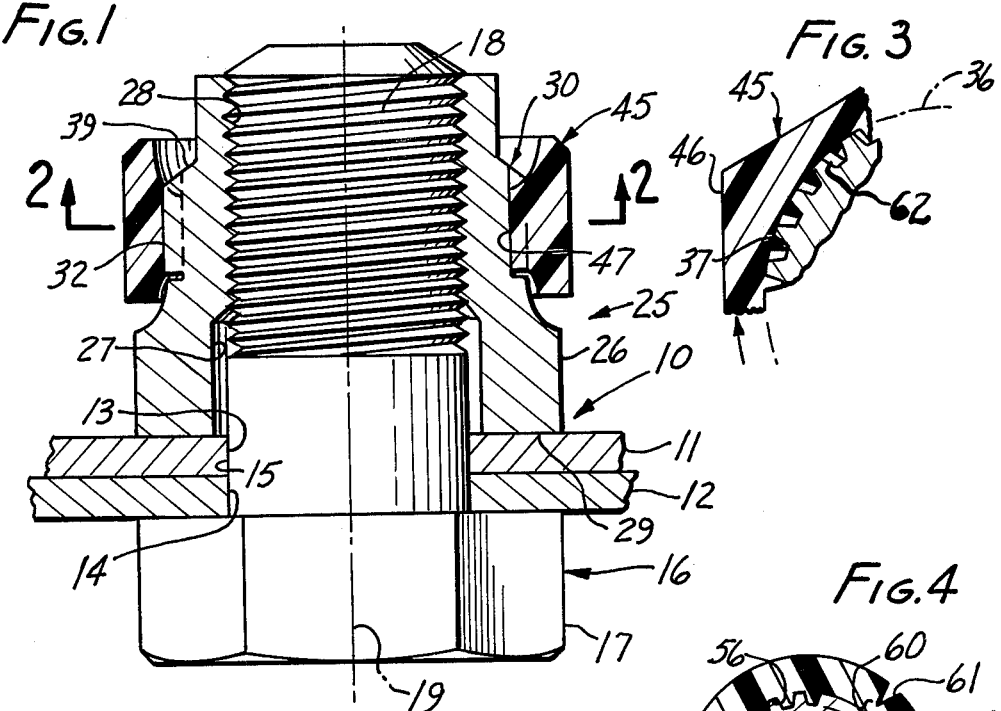
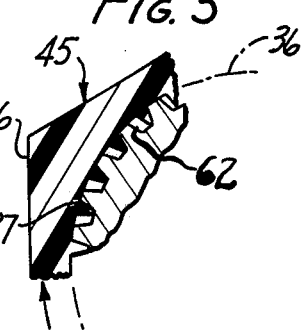
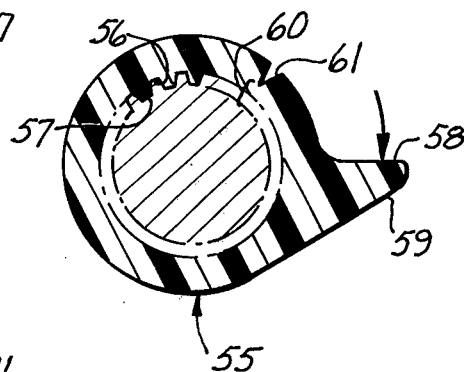
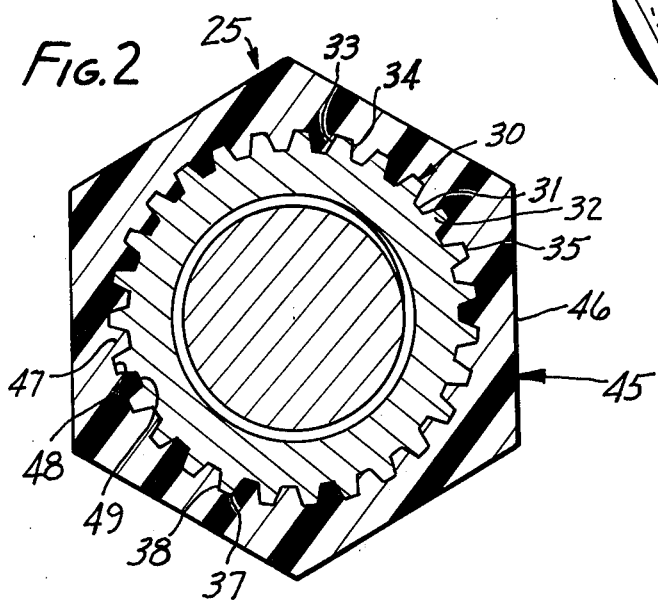

INHERENTLY TORQUE-LIMITED NUT

This invention relates to inherently torque-limited nuts.

Inherently torque-limited nuts are known in the art, for example, the well-known Hi-Lok nut shown in Wing U.S. Pat. No. 2,940,495, issued June 14, 1960. Other patents relating to this general subject are:

Dean U.S. Pat. No. 3,285,119, issued Nov. 15, 1966;
Wing U.S. Pat. No. 3,434,379, issued Mar. 25, 1969; and
Wing U.S. Pat. No. 3,449,998, issued June 17, 1969.

In addition, the art shows torque-limiting connections wherein the torque is limited by virtue of relatively rotatable frictional engaging surfaces. Among these are:

Canadian patent No. 660,630, issued Apr. 2, 1963;
U.S. Pat. No. 755,804, issued Mar. 29, 1904;
U.S. Pat. No. 2,458,391, issued Jan. 4, 1949;
U.S. Pat. No. 3,369,441, issued Feb. 20, 1968; and
German patent (Auslegeschrift) No. 1,165,292, dated Mar. 12, 1964.

Also, there are mechanically interengaging types exemplified by:

British patent No. 324,581, dated Jan. 30, 1930; and
U.S. Pat. No. 3,425,314, issued Feb. 4, 1969.

In addition, there are types of devices wherein a drive ring and a nut are interconnected by a shear pin which shears at a predetermined load. One such device is shown in Gibbens U.S. Pat. No. 3,191,486, issued June 29, 1965.

All of the foregoing prior art has some disadvantage. In devices which are made of one piece, it is necessary to discard a drive section made of material which is the same as, and as expensive as, that of the nut itself, for example titanium. It would be an economic advantage to make the structural portion of high strength material and the throw-away portion of considerably less expensive, lower strength material, perhaps a plastic. Furthermore, it is at least potentially less difficult to make an inherently torque-limiting device from a pair of materials, instead of from only one material, whereby the torque level can be controlled by parameters less demanding than those of the material of the nut portion itself.

It also is advantageous to rely upon means other than frictional forces for torque limitation, and to avoid reducing the strength of the nut portion by drilled holes to receive shear pins.

It is an object of this invention to provide an inherently torque-limited nut which can have a nut body made of any desired material and its drive ring of some other, preferably plastic, material which can fracture free at a predetermined torque so as to leave the nut body in place and not subject to further application of torque.

This invention makes it possible to design a torque controlled nut to any desirable torque value to meet any design requirements.

An inherently torque-limiting nut according to this invention includes a nut body having a central axis and an axially-extending internal shank-receiving opening therein. An internal thread in the opening is adapted to engage a mating thread on the shank. The body carries a bearing face for bearing against adjacent structure when the nut is tightened down against the structure. Engagement means extends peripherally around the outside of the nut body, and a drive ring surrounds the nut body. Engagement means on the drive ring is engaged to the mating engagement means on the nut body so as to restrain the drive ring and the nut body against rotation relative to one another. Drive means on the drive ring is provided by means of which a torque can be applied to the drive ring for turning the nut. Inherent limiting means in the drive ring limits the torque which can be transmitted by it by failing at a predetermined torque to prevent the drive ring from exerting any additional torque on said nut body.

According to a preferred but optional feature of this invention, the inherent limiting means comprises a plurality of shear sections located on a surface of revolution generated around the axis in the drive ring itself.

An additional feature of this invention is the use of the spline teeth remaining on the body after installation, for application of a removal tool.

The above and other features of this invention will be fully understood from the following detailed description and the accompanying drawings, in which:

FIG. 1 is a side elevation, principally in axial cross-section, showing the presently preferred embodiment of the invention installed in a joint;

FIG. 2 is a cross-section taken at line 2—2 of FIG. 1;

FIG. 3 shows the consequences of application of the predetermined torque to the drive ring; and FIG. 4 is a fragmentary view of an alternate embodiment of the invention.

In FIG. 1 there is shown a joint 10 made up of a pair of workpieces 11, 12 with aligned holes 13, 14 therethrough. The aligned holes pass the shank 15 of a fastener 16, such as a bolt having a head 17 that bears against workpiece 12, the shank projecting beyond workpiece 11. The shank includes an external peripheral thread 18 which extends axially relative to a central axis.

The joint is completed by an inherently torque-limited nut 25 shown in its condition before the predetermined torque has been applied. This nut includes a nut body 26 coaxial around central axis 19. It has an axially-extending shank-receiving internal opening 27 therein with an internal thread 28 to engage the mating thread 18 on the shank. The nut body has a bearing face 29 adapted to bear against the structure exemplified by adjacent workpiece 11.

It is the objective of this invention to clamp the workpieces together by applying a predetermined torque exerted on the nut body and to prevent the nut body from receiving additional torque. The nut body includes engagement means 30 which extend peripherally around the central axis on the outside of the nut body. In the presently-preferred form of the invention, this engagement means comprises a group of external splines or serrations 31 and adjacent external teeth 32. The teeth preferably have flat sides 33, 34, and a tip surface 35 which is preferably curvilinear. These tip surfaces lie upon or near a theoretical cylindrical shear surface of revolution 36 generated around the central axis. Edges 37, 38 are formed at the tip surfaces 35 so as to encourage a clean shear separation, as will later be described. It is a convenience to provide a tapered lead-in surface 39 so that a drive ring yet to be described may be broached into place in one technique of assembly.

A drive ring 45 is engaged to the nut body to apply a torque thereto. The drive ring includes external torque-receiving surfaces 46, for example, a hexagonal array of wrench-engaging surfaces or any other suitable type of torque receiving surface. It also includes engagement means 47 which are internal splines or serrations 48 which receive teeth 32 and teeth 49 which enter serrations 31. Preferably the teeth of the drive ring enter and make full area contact with the boundaries of the splines or serrations on the nut body, and the teeth on the nut body enter and make full area contact with the boundaries of the splines or serrations in the drive ring. Engagement means 47 may be formed by pressing the drive ring onto the nut body over the lead-in surfaces 39 so as to broach the serrations 48. Alternatively, the drive ring may either be molded in place on and around the nut body, or may separately be molded and be slipped onto the nut body. All of these techniques will produce substantially the same construction.

The terms "serration" and "spline" are used interchangeably. They mean groove-like recesses with side walls that may be parallel to or slanted relative to one another. The bottom of the recess may separate the two side walls, in which event the term "spline" would more frequently be used. Or they might meet at a line to form a sharp bottom groove (especially with splines on the nut body), in which event the term "serration" would more frequently be used. Combinations of these shapes may also be used, for example a sharp-bottomed recess on the body, and a curved-area bottom on the recess in the drive ring. However, where the term "spline" is used, "serration" is also meant, and vice versa. In every case there is a tooth formed between each pair of adjacent splines or serrations both in the drive ring and on the nut body. Where they abut one another, the splines and teeth of the drive ring and nut body are said to be "matching".

The drive ring includes "inherent limiting means". This means a region wherein shear-type failure is to occur to permit the drive ring to separate from the nut body as the consequence of the application of a predetermined torque. For this purpose, in the device of FIG. 1, the drive ring will be made of a substance which has a lesser shear strength than that of the nut body itself, for example, a plastic such as polyvinyl chloride or acetal homopolymer, etc., when the nut body is made of steel or titanium or any other stronger material. The shearing action will take place at the theoretical surface of revolution 36 generated around the central axis.

The surface 36 will be defined by the tip surfaces 35 of the teeth as they move, and will actually be generated by the leading edges 38. The sides should not form a knife edge, because shearing rather than slicing, is the objective. Thus, the included internal dihedral angle between sides 33 and 34 and surface 35 should not be less than about 90°. It will therefore be seen that the torque at which the drive ring will shear loose from the nut body is determined by the shear strength of the shear sections, and these can readily be designed with knowledge of their areas and the strength of material. The areas can be inherently designed into the product, and the shear strength can closely be controlled by careful control or selection of the shear strength material of which the drive ring itself is manufactured. It will also be seen that the nut body may be made of high strength (usually expensive) material and the drive ring of low strength (usually lower cost) material, thereby resulting in important economic advantage.

FIG. 4 shows another embodiment of drive ring 55 which may be applied to the nut body. In this embodiment, serrations 56 and teeth 57 are shown which are substantial duplicates of those shown in FIGS. 1-3. However, in this embodiment the torque-receiving surface 58 is on a tang or a finger 59, which applies a separative force as well as a torquing force, and the inherent limiting means comprises a section 60 of least tension-resisting area, defined by a notch 61 in the exterior of the drive ring, which will fail in tension when a predetermined torque is applied to surface 58. In this embodiment, failure of the drive ring is in tension, rather than in shear.

The operation of the devices should be obvious from the foregoing. The nut is threaded onto the shank, and then a torque is applied to the torque-receiving surfaces 46 or 58. The reaction of the FIG. 1 device is shown in FIGS. 2 and 3. Initially, and before the predetermined torque is applied, torque applied to surfaces 46 is directly transmitted to the nut body, and the bearing surface to brought against workpiece 11. As the torque builds up, finally the condition is reached such as shown in FIG. 3 where the teeth 49 of the drive ring are sheared off and carried along in the serrations 31 of the engagement means on the nut body. Fragments 62 are shown in FIG. 3. Now the drive ring is loose and cannot apply torque any longer. The nut body is therefore set at the predetermined torque, and the removal of the drive ring confirms the fact.

In FIG. 4 the reaction is essentially the same, except that when the predetermined torque is reached, the failure occurs at section 60 in tension, instead of in shear, and the drive ring 55 cannot further be driven.

This invention offers the additional advantage that, after the drive ring has been removed, the material remaining in the serrations or splines can be removed, and the serrations or splines can be engaged by a torque tool to remove the nut body.

This invention thereby provides a reliable and potentially inexpensive device for transmitting torque up to a predetermined value at which inherent limiting means yields to disable the drive ring against further tightening of the nut body.

This invention is not to be limited by the embodiments shown in the drawings and described in the description, which are given by way of example and not of limitation, but only in accordance with the scope of the appended claims.

I claim:

1. An inherently torque-limited nut comprising: a metal nut body having a central axis and an axially-extending internal shank-receiving opening therein; an internal thread in said opening adapted to engage a mating thread on said shank; a bearing face on said nut for bearing against adjacent structure when the nut is tightened down against the structure; engagement means formed as a peripheral array on the outside of the nut body comprising a plurality of axially extending alternating teeth and serrations, said teeth and serrations being defined by surfaces which are parallel to said central axis; a non-metallic ring surrounding said nut body; drive means on said drive ring by means of which a torque can be applied to the drive ring to turn the nut, said drive ring having a central opening having a wall; engagement means on said wall comprising surfaces in contact with the surfaces defining said teeth and serrations on the nut body, said contact being peripherally continuous and contiguous for a substantial length of both of said engagement means, whereby said drive ring and nut body are joined to one another in rotational driving relationship; the unit shear strength of the drive ring material being less than that of the nut body material, whereby upon exertion of a sufficient torque between the drive ring and the nut, the engagement means on the drive ring fails in shear at the tips of the teeth on the nut, two engagement means thereby constituting inherent limiting means limiting the torque which can be applied thereto by shear failure at a predetermined torque.

2. Apparatus according to claim 1 in which the drive ring is made of plastic material.

3. Apparatus according to claim 1 in which the drive ring is molded to the nut.

4. Apparatus according to claim 1 in which the drive ring is separately formed and attached to the nut.

5. Apparatus according to claim 1 in which the engagement means on said nut body is so proportioned and arranged as to be engageable by a torque tool to remove the nut body from a threaded object after the drive ring has been torqued off of the nut body.

6. Apparatus according to claim 1 in which the surfaces which define each tooth on the nut comprise a pair of planar side surfaces and a curvilinear surface interconnecting said side surfaces, said curvilinear surface lying on an imaginary cylinder concentric with said axis, and forming with at least one of said side surfaces a dihedral angle of less than 90°.

7. An inherently torque-limited nut comprising: a method nut body having a central axis and an axially-extending internal shank-receiving opening therein; and internal thread in said opening adapted to engage a mating thread on said shank; a bearing against adjacent structure when the nut is tightened down against the structure; engagement means formed as a peripheral array on the outside of the nut body comprising a plurality of axially-extending alternating teeth and serrations, said teeth and serrations being defined by surfaces which are parallel to said central axis; a nonmetallic drive ring surrounding said nut body, said drive ring having a central opening having a wall; engagement means on said wall comprising surfaces in contact with the surfaces defining said teeth and said serrations on the nut body, said contact being peripherally continuous and contiguous for a substantial length of both of said engagement means, whereby said drive ring and nut body are joined to one another in rotational driving relationship; eccentric drive means on said drive ring by means of which a torque can be applied to the drive ring to turn the nut; and inherent torque limiting means to limit the torque which can be applied to the nut body through the eccentric drive means comprising a reduced axially-extending cross-section in said drive ring behind the eccentric drive means in the sense in which the nut is turned when being tightened, whereby the drive ring fails in tension at said reduced section when a sufficient predetermined torque is applied to the eccentric drive means.

8. Apparatus according to claim 7 in which the drive ring is made of plastic material.

* * * * *

UNITED STATES PATENT AND TRADEMARK OFFICE
CERTIFICATE OF CORRECTION

PATENT NO. : 4,068,555
DATED : January 17, 1978
INVENTOR(S) : JOSEF F. VOLKMANN

It is certified that error appears in the above–identified patent and that said Letters Patent are hereby corrected as shown below:

Col. 5, line 23, before "less" insert --not--

Signed and Sealed this

Eighth Day of July 1980

[SEAL]

*Attest:*

SIDNEY A. DIAMOND

*Attesting Officer*     *Commissioner of Patents and Trademarks*